Sept. 21, 1954   J. L. MEADOWS   2,689,820
DETHIOLIZING HYDROCARBONS
Filed Feb. 10, 1953
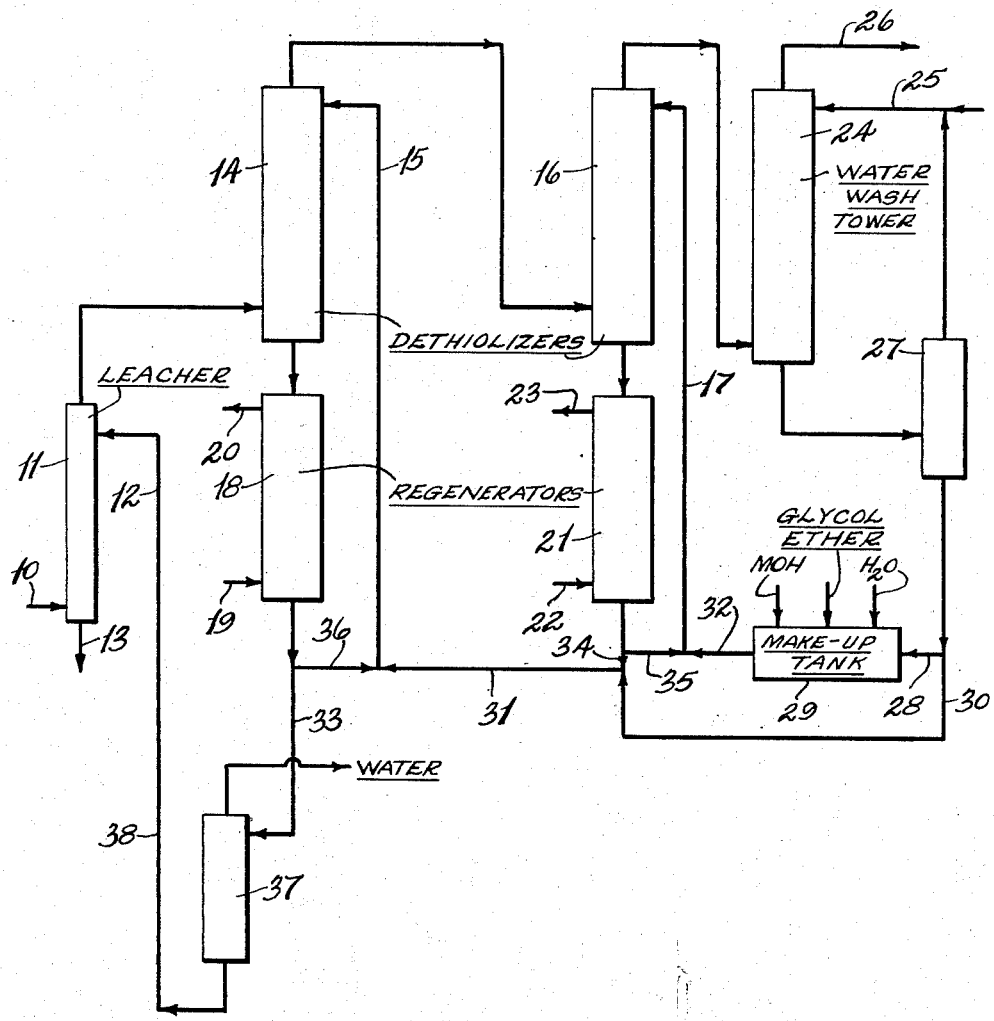
INVENTOR.
BY James L. Meadows Patented Sept. 21, 1954

2,689,820

UNITED STATES PATENT OFFICE 2,689,820

DETHIOLIZING HYDROCARBONS

James L. Meadows, Port Arthur, Tex., assignor to The Texas Company, New York, N. Y., a corporation of Delaware Application February 10, 1953, Serial No. 336,053

3 Claims. (Cl. 196—32)

This invention relates to certain improvements in the treatment of hydrocarbons with solutions of glycol ethers and alkali metal hydroxides to effect dethiolizing of the hydrocarbons.

This application is a continuation-in-part of my abandoned application, Ser. No. 259,177, filed November 30, 1951.

Solutions of alkali metal hydroxides in glycol ethers are very effective in accomplishing the removal of mercaptans particularly the higher molecular weight and more difficultly removable mercaptans from petroleum distillates, such as gasoline or naphtha and kerosene. By treating with the glycol ether solution it is possible to obtain complete removal of the mercaptans in cases where it is impossible to obtain such removal by treating with aqueous alkali metal hydroxide in the absence of the glycol ether. However, the very characteristic of the glycol ether is being soluble in both the hydrocarbon and the aqueous hydroxide, which is no doubt the reason for its effectiveness in mercaptan removal, presents a disadvantage due to loss of the solvent in both the treated distillate and the spent alkali which is withdrawn from the system.

The present invention seeks to prevent this loss in solvent and undertakes to provide a process in which the solvent is retained in the process for repeated reuse. The invention constitutes a modification of the invention disclosed in the copending application Ser. No. 259,178 of Robert H. Howell, Ambrose J. Startz, Gordon H. Miller and applicant, filed November 30, 1951, now U. S. Patent 2,641,572. The co-pending application discloses a process in which hydrocarbon oil containing mercaptans is contacted with a solution of alkali metal hydroxide and glycol ether, the used treating solution is regenerated and a cyclic flow of dethiolizing solution is maintained between the dethiolizing zone and the regenerating zone for the repeated reactivation and re-use of the dethiolizer solution. There is a certain amount of consumption of the alkali metal hydroxide due to conversion to a non-titratable form as a result of neutralization by saponifiable material in the hydrocarbons and by side reactions occurring in the regeneration, and consequently it is desirable to reject from the system a relatively small quantity of the alkaline treating reagent. In accordance with the invention disclosed in said pending application a portion of the dethiolizing solution is withdrawn from the dethiolizing-regenerating cycle and contacted with charging stock flowing to the treating or dethiolizing zone to thereby leach the glycol ether from the dethiolizing solution so as to reject from the system only the alkaline material. The hydrocarbon containing the absorbed glycol ether is directed to the treating or dethiolizing zone. The separated alkaline material, substantially free from glycol ether, is withdrawn from the system.

In accordance with the present invention the dethiolizing solution which is withdrawn from the dethiolizing-regenerating cycle is subjected to distillation for the removal of water and the concentrated solution of alkaline material is contacted with charging stock flowing to the treating or dethiolizing zone to thereby leach the glycol ether from the dethiolizing solution so as to reject from the system only the alkaline material.

In order to insure the complete recovery of the glycol ether before rejecting the alkaline material from the system, it is necessary that the leaching agent, that is the hydrocarbon charging stock, be very considerably in excess of the amount of the dethiolizer solution when it is contacted in the leaching zone. The present invention reduces the volume of alkaline material to be contacted with the charging stock with a resultant increase in the ratio of charging stock to alkaline solution. In cases where the consumption of alkali metal hydroxide is relatively low there will ordinarily be a sufficient quantity, in fact, an excess of charging stock available for a satisfactory leaching operation. In cases where the consumption of alkali metal hydroxide is quite high there may not be a sufficient quantity of charging stock to perform a satisfactory leaching operation when the total glycol ether-hydroxide solution to be withdrawn is contacted with the charge. Consequently the present invention has a special field of usefulness in cases where the consumption of the hydroxide is high. The extent of the consumption is, of course, dependent upon the nature of the impurities in the stock being treated in the system.

In practicing the invention petroleum distillates, particularly the lighter distillates, such as gasoline or naphtha and kerosene, are contacted with a treating reagent comprising an alkali metal hydroxide, such as sodium or potassium hydroxide, in an ether of a polyhydric alcohol, such as diethylene glycol monomethyl ether, commonly available under the name of methyl Carbitol or ethylene glycol monomethyl ether, commonly available under the name of methyl Cellosolve. The used treating solution is withdrawn from the mercaptan sulfur extractor or treating zone and regenerated by oxidation, and the reactivated reagent is recycled to the treating zone. The recycled reagent is maintained at a normality effective to accomplish the complete removal of the mercaptans and produce a sweet product. It has been found in practice that usually a normality of about 4 to 2 is effective on most distillate stocks. A relatively small portion of the dethiolizing solution is withdrawn continuously or at intervals from the dethiolizing-regenerating cycles and subjected to distillation for the removal of water and the concentrated solution is contacted with charging stock flowing to the treating or dethiolizing zone to thereby leach the glycol ether from the solution so that the alkaline material rejected from the system will be substantially free from solvent.

For the purpose of more fully disclosing the invention reference is had herein to the accompanying drawing which is a flow diagram of a preferred embodiment of the invention.

In the dethiolizing treatment of the hydrocarbon the mercaptan extraction or dethiolizing zone may consist of a single treating stage, such as a single countercurrent contacting tower, or of a plurality of stages. In the particular treatment illustrated in the drawing the dethiolizing zone is composed of two successive stages with a regenerator for each stage. Hydrocarbon charging stock is introduced through line 10 to a leaching tower 11 where it is contacted with alkaline material containing portions of glycol ether as is hereinafter explained. The hydrocarbon leaches the glycol ether from the alkaline material and the alkaline material free of glycol ether is withdrawn through line 13. The charging stock containing the absorbed glycol ether passes to the first stage 14 of a mercaptan sulfur extraction zone wherein it is contacted with dethiolizer solution admitted through line 15. The treated hydrocarbon flows to a second stage 16 of the dethiolizer zone wherein it is contacted with dethiolizing solution admitted through line 17. Each of the stages 14 and 16 may consist of a single unit, such as a countercurrent contacting tower, or each may be composed of a plurality of units.

The used treating solution is withdrawn from the primary treating zone 14 and directed to a regenerator 18 wherein it is subjected to oxidation with air or oxygen admitted through line 19. The spent oxidizing fluid is removed through line 20. The used treating solution from the secondary treating zone 16 is directed to a regenerator 21 wherein it is subjected to oxidation with air or oxygen admitted through line 22. The spent oxidizing fluid is removed through line 23. The dethiolized hydrocarbon containing some glycol ether passes to a washing tower 24 to which water is charged through a line 25. The dethiolized hydrocarbon free from glycol ether flows out through line 26. The water containing the absorbed glycol ether is withdrawn to a stripping still 27 wherein the water is distilled overhead, the water vapors being condensed and the condensate recycled to the wash tower 24. It is advantageous to recycle the water in this manner so that any traces of glycol ether contained in the water can be retained in the system. Very little make-up water is required. The concentrated glycol ether is withdrawn from the stripping still 27 and is directed either through line 28 to the make-up tank 29 or is sent through lines 30 and 31 thence through line 15 to the primary treating zone 14. Fresh alkali metal hydroxide, water and glycol ether are charged to the make-up tank 29 from which dethiolizing solution is directed through line 32 thence through line 17 to the secondary treating zone 16. Regenerated dethiolizer solution is regularly withdrawn from the primary regenerator 18 through line 33 and regenerated dethiolizer solution is regularly withdrawn from the secondary regenerator 21 through line 34.

In the secondary stage 16 the hydrocarbon is treated with a strong solution of alkali metal hydroxide and glycol ether composed of solution from the make-up tank 29 directed through line 32 and of a portion of the regenerated solution withdrawn from line 34 through line 35. In the primary stage 14 the hydrocarbon is treated with a relatively weaker dethiolizer solution composed of recycle solution withdrawn from regenerator 18 through lines 33 and 36, and solution admitted through line 31 containing a portion of the regenerated solution from regenerator 21, which is withdrawn from line 34, and such recovered glycol ether as may be directed through line 30. The normality of the dethiolizing solution for the secondary stage 16 is relatively high, such as 4 normal or higher and the normality of the solution employed for the primary zone 14 is relatively lower, such as about 1 or 2. In the process practically all of the saponifiable constituents, phenols, and other acidic materials are removed from the charging stock in the leacher 11 and primary extraction stage 14 so that complete removal of the mercaptans is readily effected with the strong dethiolizer solution in the secondary stage 16.

In accordance with the present invention a portion of the regenerated solution is withdrawn from the cycle through line 33 and is directed to a still 37 where it is subjected to distillation to remove a portion of the water. The concentrated solution of alkaline material is withdrawn through line 38 and directed thence through line 12 to the leacher 11 so that the glycol ether contained in the alkaline solution will be absorbed by the hydrocarbon charging stock.

An advantageous operation is to combine the distilling operations of stills 27 and 37 in a single still. In other words, both the alkaline glycol ether solution withdrawn from the cycle through line 33 and the wash water withdrawn from wash tower 24 are directed to a single still wherein the constituents are subjected to distillation to remove a portion of the water. The bottoms are directed to the leacher 11. The water condensate is allowed to accumulate and is used as needed in the wash tower 24. The glycol ether phase is sent to either or both of the dethiolizer zones.

In a typical operation with the system shown in the drawing a sour straight run naphtha is treated with a solution of potassium hydroxide and methyl Carbitol. It is ordinarily preferred to use potassium hydroxide rather than sodium hydroxide in view of the somewhat greater activity of the potassium hydroxide, and since the effective use of the reagent in the process makes the higher cost of the potassium hydroxide of relatively small moment. The naphtha at the rate of 10,000 bbls. per day is charged to the leacher 11 and the naphtha containing absorbed methyl Carbitol passes to the primary extraction stage 14, thence to the secondary extraction stage 16. Fresh dethiolizer solution is prepared in tank 29 with potassium hydroxide added at the rate of 1,380 lbs. per day and water at a rate of 3.5 bbls. per day. Methyl Carbitol is withdrawn from the stripping still 27 at a rate of 50 bbls. per day of which 13.0 bbls. per day is directed to the tank 29, and of which 37.0 bbls. per day is directed through lines 30 and 31. Dethiolizer solution having a normality of 4 is charged to the extractor 16 at the rate of 2,000 bbls. per day, being composed of recycle solution from the regenerator 21 and 27.0 bbls. per day of fresh dethiolizer solution drawn from tank 29. In the primary treating zone dethiolizing solution having a normality of 2 is charged through line 15 to the extractor 14 at a rate of 2,000 bbls. per day, this solution being composed of recycle dethiolizer solution, drawn from regenerator 18 through line 36, and dethiolizer solution composed of a portion of the regenerated solution withdrawn from the regenerator of the secondary stage (through line 31) and the 37.0 bbls. of methyl Carbitol recovered from the stripping still 27. Dethiolizer solution from the regenerator 18 is withdrawn from the cycle through line 33 at a rate of 27.0 bbls. per day, and is directed to the still 37 where it is subjected to distillation to remove a portion of the water. The concentrated solution is withdrawn from the stripping still 37 at a rate of 20.2 bbls. per day and directed through lines 38 and 12 to the leaching tower 11. The spent caustic is withdrawn through line 13 at a rate of 7.8 bbls. per day, representing a KOH consumption in the extraction and regenerating steps of 0.3 gram per liter of charging stock. The sweet naphtha is continuously withdrawn through line 26.

Although a preferred embodiment of the invention has been described herein, it will be understood that various changes and modifications may be made therein, while securing to a greater or less extent some or all of the benefits of the invention, without departing from the spirit and scope thereof.

I claim:

1. The process of dethiolizing hydrocarbons that comprises contacting hydrocarbons in a dethiolizing zone with a solution of alkali metal hydroxide and glycol ether to effect removal of mercaptans, regenerating the used treating solution in a regenerating zone, maintaining a cyclic flow of treating solution between the dethiolizing zone and regenerating zone, withdrawing from the dethiolizing-regenerating cycle a portion of the treating solution, concentrating the alkali metal hydroxide by removal of water from the solution so withdrawn, contacting the concentrated solution with hydrocarbon charging stock flowing to the system to thereby leach the glycol ether from the treating solution and withdrawing the separated alkali metal hydroxide from the system.

2. The process according to claim 1 in which the glycol ether employed is diethylene glycol monomethyl ether.

3. The process of dethiolizing hydrocarbons that comprises contacting the hydrocarbons in a dethiolizing zone with a solution of alkali metal hydroxide and glycol ether to effect removal of mercaptans, separately withdrawing from the dethiolizing zone used treating solution and dethiolized hydrocarbons, regenerating the withdrawn treating solution by oxidation, recycling the major portion of the regenerated treating solution to the dethiolizing zone, subjecting a minor portion of the regenerated treating solution to distillation to distill off a portion of the water, contacting the resultant concentrated treating solution with hydrocarbon charging stock to leach the contained glycol ether therefrom, passing the hydrocarbon charging stock containing absorbed glycol ether to the dethiolizing zone and withdrawing the separated alkaline material from the system.

No references cited.